US011054957B2

United States Patent
Jang et al.

(10) Patent No.: US 11,054,957 B2
(45) Date of Patent: Jul. 6, 2021

(54) TOUCH DISPLAY DEVICE

(71) Applicant: LG Display Co., Ltd., Seoul (KR)

(72) Inventors: Yoonnara Jang, Seoul (KR); Jae-Gyun Lee, Paju-si (KR); Jung-Ho Jo, Seoul (KR); Jeong-Hoon Lee, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/915,769

(22) Filed: Jun. 29, 2020

(65) Prior Publication Data
    US 2021/0004126 A1    Jan. 7, 2021

(30) Foreign Application Priority Data
    Jul. 4, 2019 (KR) .................. 10-2019-0080839

(51) Int. Cl.
    *G06F 3/044* (2006.01)
    *G06F 3/041* (2006.01)
(52) U.S. Cl.
    CPC .......... *G06F 3/0448* (2019.05); *G06F 3/0412* (2013.01); *G06F 3/0443* (2019.05); *G06F 3/04164* (2019.05)
(58) Field of Classification Search
    CPC .. G06F 3/0412; G06F 3/04164; G06F 3/0443; G06F 3/0448
    USPC .................................................. 345/170–178
    See application file for complete search history.

(56) References Cited

U.S. PATENT DOCUMENTS

| | | | | |
|---|---|---|---|---|
| 2010/0301879 | A1* | 12/2010 | Philipp | H03K 17/962 324/679 |
| 2011/0248954 | A1* | 10/2011 | Hamada | G06F 3/03547 345/174 |
| 2014/0267945 | A1* | 9/2014 | Lee | G06F 3/0448 349/12 |
| 2017/0344186 | A1* | 11/2017 | Na | G06F 3/0446 |
| 2018/0188849 | A1* | 7/2018 | Ko | H01L 27/3272 |
| 2018/0373359 | A1* | 12/2018 | Han | G06F 3/0443 |
| 2019/0004626 | A1* | 1/2019 | Ko | G06F 3/0443 |
| 2019/0042019 | A1* | 2/2019 | Ding | G06F 3/044 |
| 2021/0004126 | A1* | 1/2021 | Jang | G06F 3/0448 |

* cited by examiner

*Primary Examiner* — Tony O Davis
(74) *Attorney, Agent, or Firm* — Fenwick & West LLP

(57) ABSTRACT

Disclosed is a touch display device capable of reducing deterioration in touch performance. The touch display device includes a plurality of first touch electrodes disposed in an active area of a substrate and a plurality of second touch electrodes disposed in the active area of the substrate, the plurality of second touch electrodes having different shapes from the plurality of first touch electrodes, wherein at least one of the plurality of second touch electrodes is formed by connecting at least two sub-electrodes having smaller areas than each of the first touch electrodes to each other. Consequently, the areas of the first and second touch electrodes are similar to each other, whereby it is possible to reduce touch performance deteriorated due to deviation in area between the touch electrodes.

12 Claims, 18 Drawing Sheets

TOUCH DISPLAY DEVICE

CROSS-REFERENCE TO RELATED APPLICATIONS

This application claims the benefit of Republic of Korea Patent Application No. 10-2019-0080839, filed on Jul. 4, 2019, which is hereby incorporated by reference in its entirety.

BACKGROUND

Field of Technology

The present disclosure relates to a display device, and more particularly to a touch display device capable of reducing deterioration in touch performance.

Discussion of the Related Art

A touchscreen is an input device that allows a user to input a command by selecting one of instructions displayed on a screen, such as that of a display device, using a user's hand or an object. That is, the touchscreen converts the contact position, at which the user's hand or the object directly contacts the touchscreen, into an electrical signal to receive the instruction selected at the contact position as an input signal. Use of the touchscreen has increased, since the touchscreen is capable of replacing a separate input device that is connected to the display device for operation, such as a keyboard or a mouse.

In general, a touchscreen is designed in the shape of the screen of a display panel. The display panel may be designed so as to have a heteromorphic shape design, such as a curved line or an oblique line, depending on a device to which the display panel is applied.

In the case in which the heteromorphic shape design is applied to the touchscreen, the area of a touch electrode is changed depending on the position of the touch electrode. That is, a touch electrode disposed in an area to which the different shape design is applied is formed so as to have a relatively small area, and a touch electrode disposed in an area to which no different shape design is applied is formed so as to have a relatively large area. In this case, when user touch input is performed using the small-area touch electrode, touch sensitivity is reduced, since the area of contact between the small-area touch electrode and the user touch input is small.

In addition, a difference occurs between a sensing signal received from the small-area touch electrode and a sensing signal received from the large-area touch electrode even though there is no touch input. In this case, touch input is sensed even though there is no touch input, whereby touch accuracy is reduced.

SUMMARY

Accordingly, the present disclosure is directed to a touch display device that substantially obviates one or more problems due to limitations and disadvantages of the related art.

An object of the present disclosure is to provide a touch display device capable of reducing deterioration in touch performance.

Additional advantages, objects, and features of the disclosure will be set forth in part in the description which follows and in part will become apparent to those having ordinary skill in the art upon examination of the following or may be learned from practice of the disclosure. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a touch display device includes a plurality of first touch electrodes disposed in an active area of a substrate and a plurality of second touch electrodes disposed in the active area of the substrate, the plurality of second touch electrodes having different shapes from the plurality of first touch electrodes, wherein at least one of the plurality of second touch electrodes is formed by connecting at least two sub-electrodes having smaller areas than each of the plurality of first touch electrodes to each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Hereinafter, embodiments of the present disclosure will be described in detail with reference to the accompanying drawings.

Figure 1:
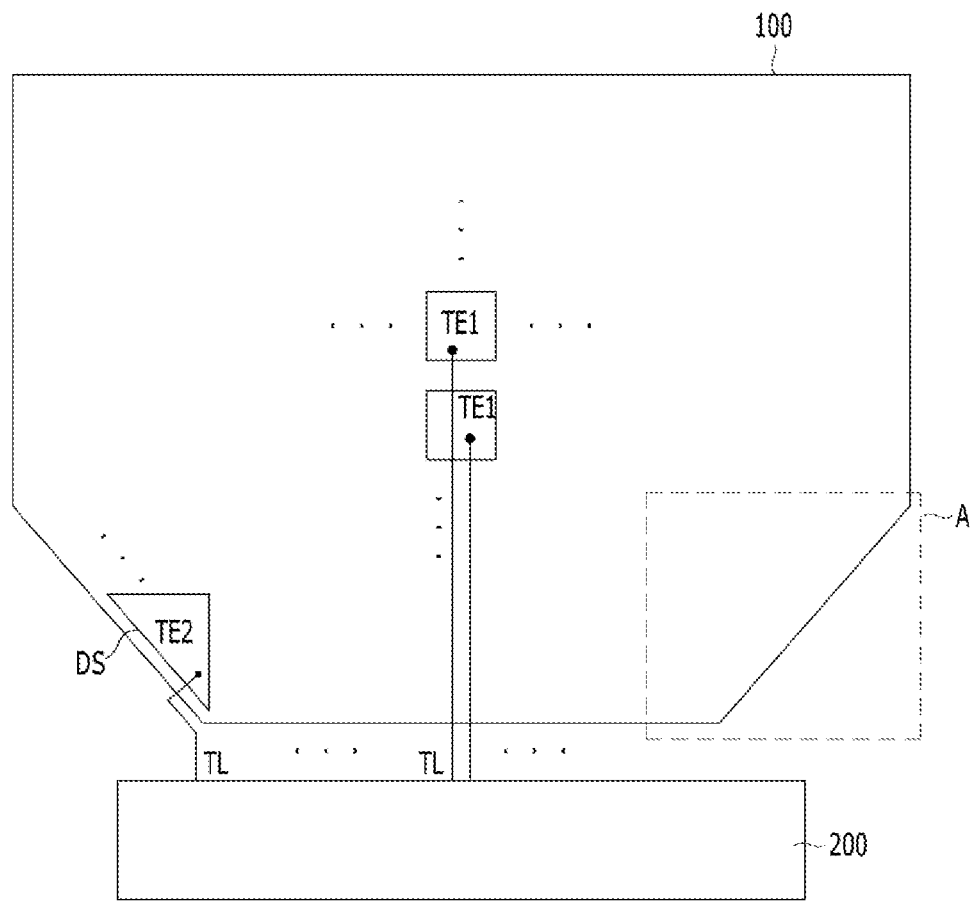
FIG. 1 is a view showing a touch display device according to one embodiment of the present disclosure.

FIG. 1 is a view showing a touch display device according to the present invention.

The touch display device shown in FIG. 1 includes a display panel 100 and a drive circuit unit 200.

The drive circuit unit 200 supplies a touch drive signal to touch electrodes TE1 and TE2 through touch lines TL to sense touch input. That is, the drive circuit unit 200 analyzes the quantity of electric charge of a touch sensor that is changed depending on whether there is touch input to determine touch input, and calculates the coordinates of a touch input position. The drive circuit unit 200 may be realized by an integrated touch display drive IC (TDDI) in which a display drive circuit configured to drive subpixels disposed at the display panel 100 and a touch drive circuit configured to drive the touch electrodes TE1 and TE2 are integrated, or the display drive circuit and the touch drive circuit may be individually realized.

The display panel 100 performs a touch sensing function and a display function. To this end, the display panel 100 displays an image through subpixels arranged in a matrix, and performs the touch sensing function using the plurality of touch electrodes TE1 and TE2. Each of the plurality of touch electrodes TE1 and TE2 is used as a self-capacitance touch sensor configured to sense a change in capacitance due to user touch. In a self-capacitance sensing method using such touch electrodes TE1 and TE2, electric charge Q is accumulated in a touch sensor when a touch drive signal supplied through a touch line TL is applied to the touch electrodes TE1 and TE2. At this time, when a user's finger or a conductive object contacts the touch electrodes TE1 and TE2, parasitic capacitance is additionally connected to a self-capacitance sensor, whereby the value of capacitance is changed. Consequently, the value of capacitance of the touch sensor touched by the finger is different from the value of capacitance of a touch sensor not touched by the finger, whereby it is possible to determine whether touch has been performed.

The display panel 100 includes an active area AA and a non-active area NA, as shown in FIGS. 2A to 2D. The active area is an area in which an image is displayed. The non-active area is an area in which an image is not displayed and is disposed on at least one side of the active area. The display panel 100 configured to perform the touch sensing function and the display function is designed so as to have various shapes other than a conventional quadrangular shape in a wearable device, a flexible device, a dashboard, etc. For example, an active area AA of the display panel 100 in which an image is displayed is designed so as to have different shape designs, such as shapes with oblique lines shown in FIGS. 1, 2A, and 2B, a circular shape shown in FIG. 2C, an oval shape shown in FIG. 2D, a shape with a curved line, or a polygonal shape.

The shape of the touch electrodes TE1 and TE2 disposed in the active area AA is changed depending on the shape of the active area AA designed so as to have different shape designs. That is, the touch electrode according to the present invention includes a plurality of first touch electrodes TE1 and a plurality of second touch electrodes TE2 having different shapes from the first touch electrodes TE1, as shown in FIGS. 3A to 3D.

The first touch electrodes TE1 are disposed in a first active area AA1, excluding different shape surfaces, such as an inclined surface or a curved surface, of the active area AA, and are formed so as to have the same shape. For example, the first touch electrodes TE1 is formed so as to have a quadrangular shape, or is formed such that imaginary lines formed along the edge of an opaque metal layer formed in a mesh shape constitute a quadrangular shape.

The plurality of second touch electrodes TE2 is formed so as to have shapes different from the shape of the first touch electrodes TE1, and at least one of the plurality of second touch electrodes TE2 is formed so as to have a different shape from the other second touch electrodes TE2. For example, the plurality of first touch electrodes TE1 is formed so as to have a quadrangular or square shape, at least one of the plurality of second touch electrodes TE2 is formed so as to have a triangular shape, and the other second touch electrodes TE2 are formed so as to have a quadrangular shape with an oblique line.

Specifically, the second touch electrodes TE2 have different shape sides DS, which are at least one of a curved line or an oblique line different from the first touch electrodes TE1. The different shape sides DS of the plurality of second touch electrodes TE2 are disposed along the edge of the active area AA, whereby the active area AA may be designed so as to have a different shape design.

As shown in FIGS. 3A to 3D, each of the second touch electrodes TE2 includes at least two sub-electrodes SE having different shape sides DS and at least one dummy electrode DE disposed between the at least two sub-electrodes SE so as to interconnect the sub-electrodes SE. The at least two sub-electrodes SE and the dummy electrode DE are connected to form a second touch electrodes TE2. At this time, the area of each of the at least two sub-electrodes SE and the dummy electrode DE is less than the area of each of the first touch electrodes TE1.

Figure 3A:
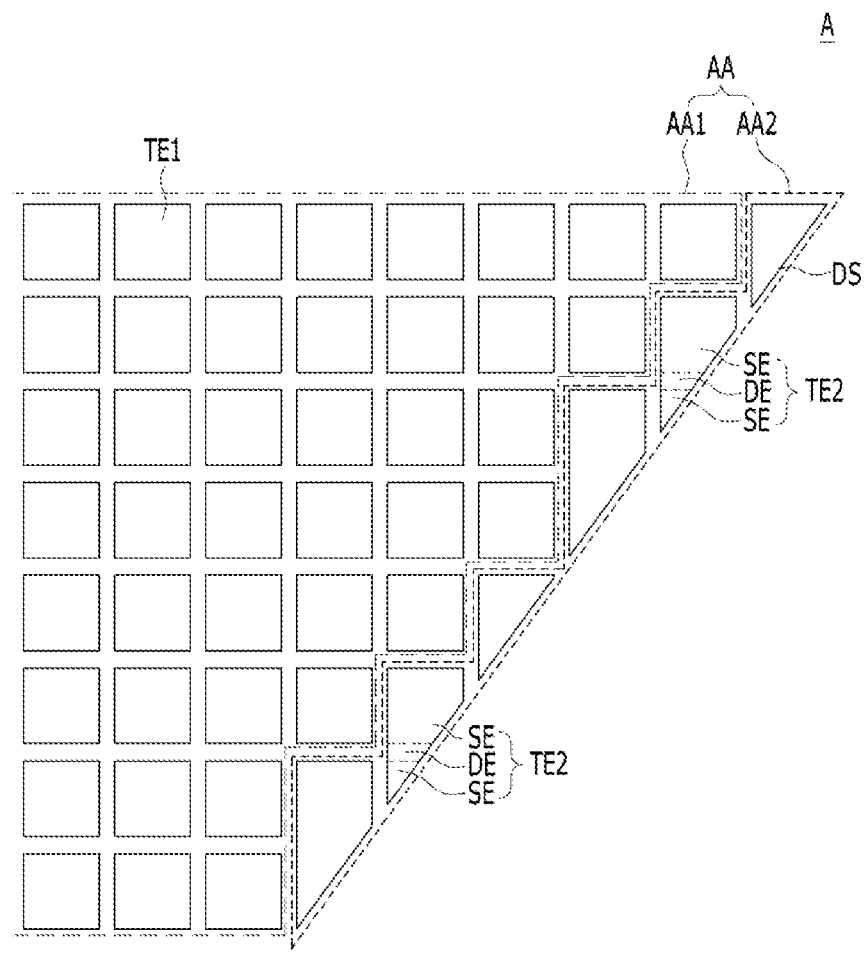
FIGS. 3A to 3D are views showing embodiments of region A of FIG. 1 according to one embodiment of the present disclosure.
Figure 3B:
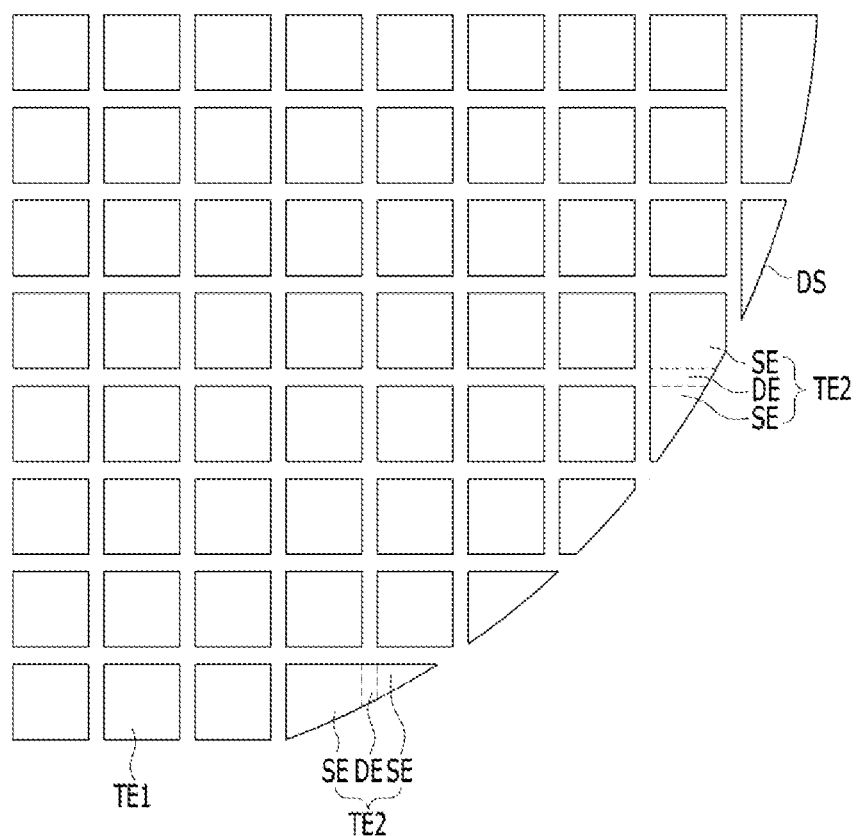
Figure 3C:
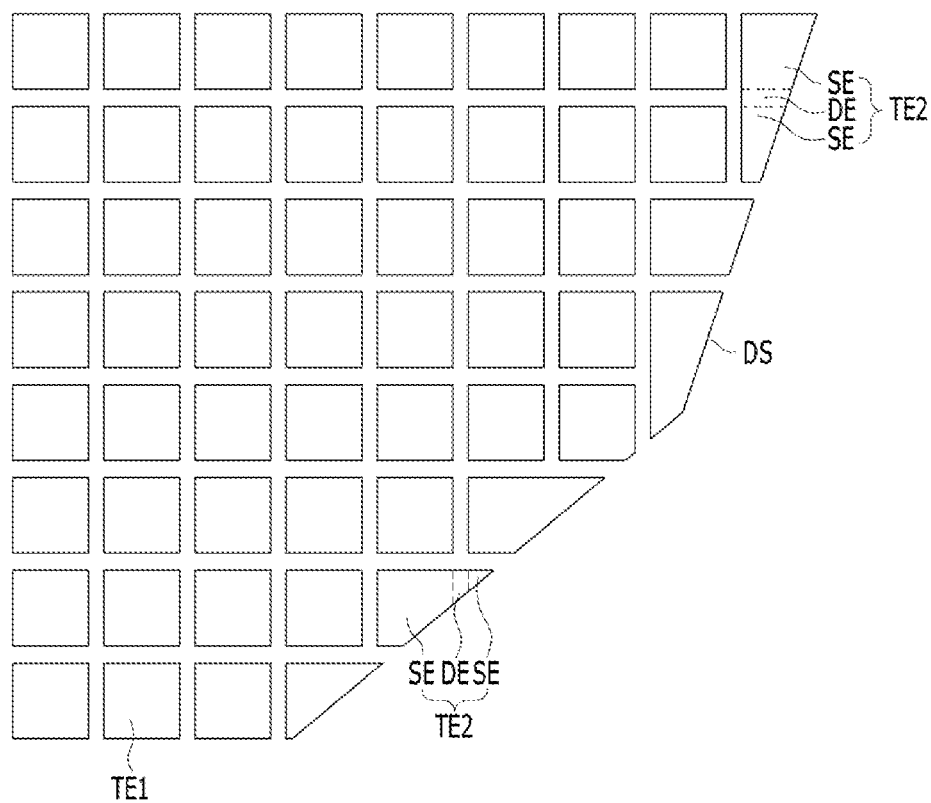

A second touch electrode TE2 shown in FIG. 3A is formed by coupling sub-electrodes SE adjacent to each other in the upward-downward direction and a dummy electrode DE disposed between the sub-electrodes SE to each other. At this time, the dummy electrode DE is disposed in parallel to the area between the first touch electrodes TE1.

Figure 3D:
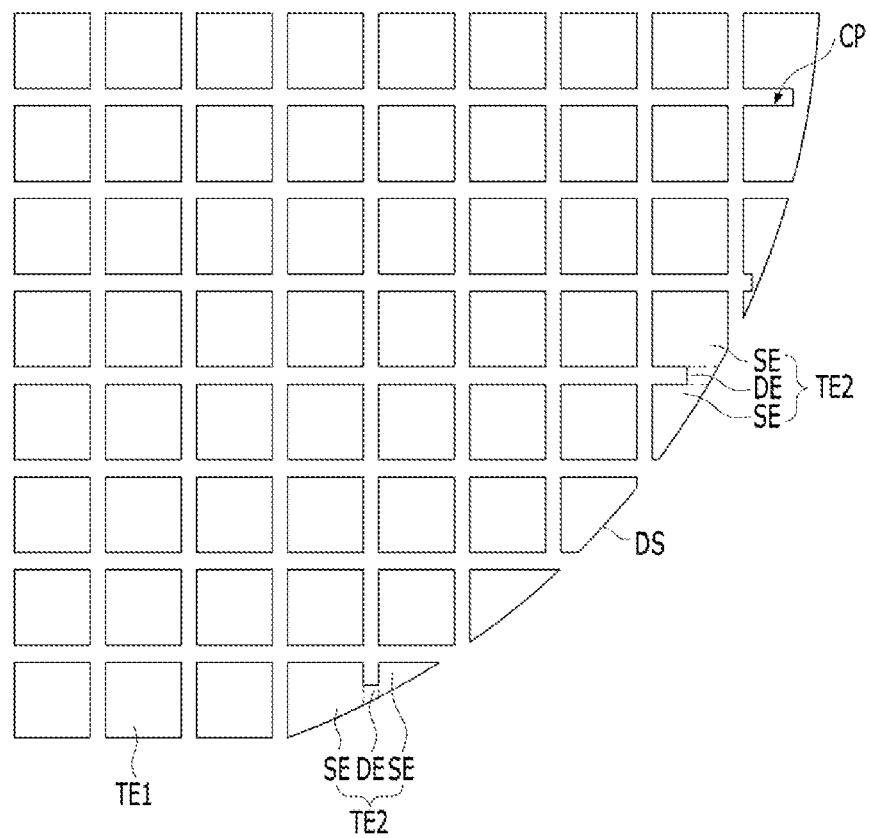

As shown in FIGS. 3A to 3D, a second touch electrode TE2 is formed by coupling sub-electrodes SE adjacent to each other in at least one of the upward-downward direction or the leftward-rightward direction and a dummy electrode DE disposed between the sub-electrodes SE to each other. Since the dummy electrode DE shown in FIG. 3D is formed so as to have a smaller length and width than the sub-electrodes SE, a concave portion CP is formed between the sub-electrodes SE. Consequently, the dummy electrode DE shown in FIG. 3D has a smaller area than the dummy electrodes DE shown in FIGS. 3A to 3C, whereby it is possible to reduce the dummy electrode DE from being seen by a user.

Figure 4A:
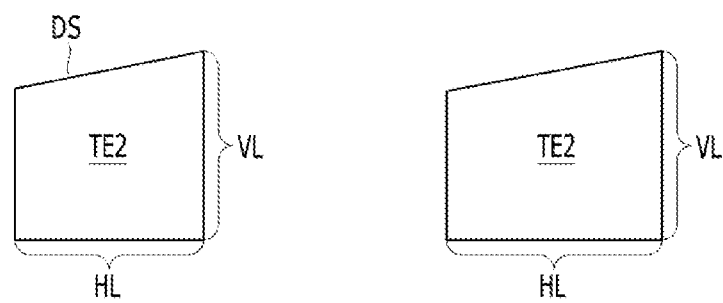
FIGS. 4A to 4D are views showing embodiments of a second touch electrode shown in FIG. 1.
Figure 4B:
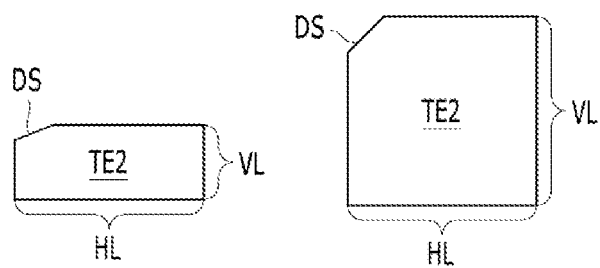
Figure 4C:
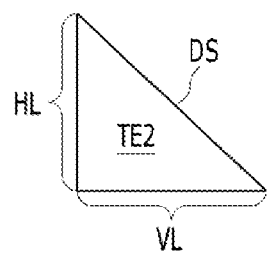
Figure 4D:
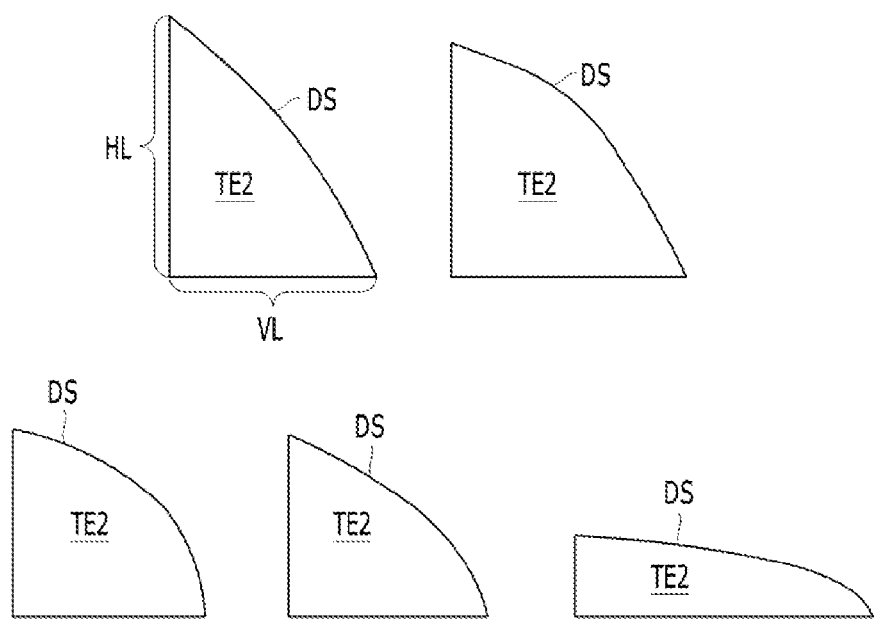

The second touch electrode TE2 formed by coupling between the sub-electrodes SE and the dummy electrode DE, as described above, is formed so as to have one of structures shown in FIGS. 4A to 4D. The second touch electrode TE2 shown in FIG. 4A is formed in a quadrangular shape having a sum of interior angles of 360 degrees and having at least one oblique line as a different shape side DS, and the second touch electrode TE2 shown in FIG. 4B is formed in a pentagonal shape having a sum of interior angles of 360 degrees or more and having at least one oblique line as a different shape side DS. The second touch electrode TE2 shown in FIG. 4C is formed in a triangular shape having a sum of interior angles of 180 degrees and having at least one oblique line as a different shape side DS, and the second touch electrode TE2 shown in FIG. 4D is formed so as to have at least one curved line as a different shape side DS.

The greatest length among the length of the different shape side DS of the second touch electrode TE2, the horizontal length HL of the second touch electrode TE2, and the vertical length VL of the second touch electrode TE2 is formed so as to be greater than the greatest length among the horizontal and vertical lengths of the first touch electrode TE1. At this time, the area of each of the second touch electrodes TE2 is formed so as to have a difference of a maximum of 20% from the area of each of the first touch electrodes TE1 such that each of the second touch electrodes TE2 has an area similar to the area of each of the first touch electrodes TE1. That is, at least one of the plurality of second touch electrodes TE2 has an area greater than 100% and less than 120% of the area of each of the first touch electrodes TE1, and the other of the plurality of second touch electrodes TE2 have areas equivalent to 80 to 100% of the area of each of the first touch electrodes TE1.

In the present disclosure, as described above, the first touch electrodes TE1 and the second touch electrodes TE2 are formed such that deviation in area therebetween is small. In the case in which there is no touch input, therefore, there is no difference between first touch sensing signals received from the first touch electrodes TE1 and second touch sensing signals received from the second touch electrodes TE2, whereby accurate touch sensing is possible.

Also, in the present disclosure, the areas of the first and second touch electrodes TE1 and TE2 are similar to each other in the active area AA, whereby the different shape sides DS of the second touch electrodes TE2 are disposed along the edge of the active area AA having the oblique line and the curved line. Consequently, it is not necessary to extend the second touch electrodes TE2 to a bezel area such that the areas of the first and second touch electrodes TE1 and TE2 are similar to each other, whereby it is possible to realize a narrow bezel.

Figure 5:
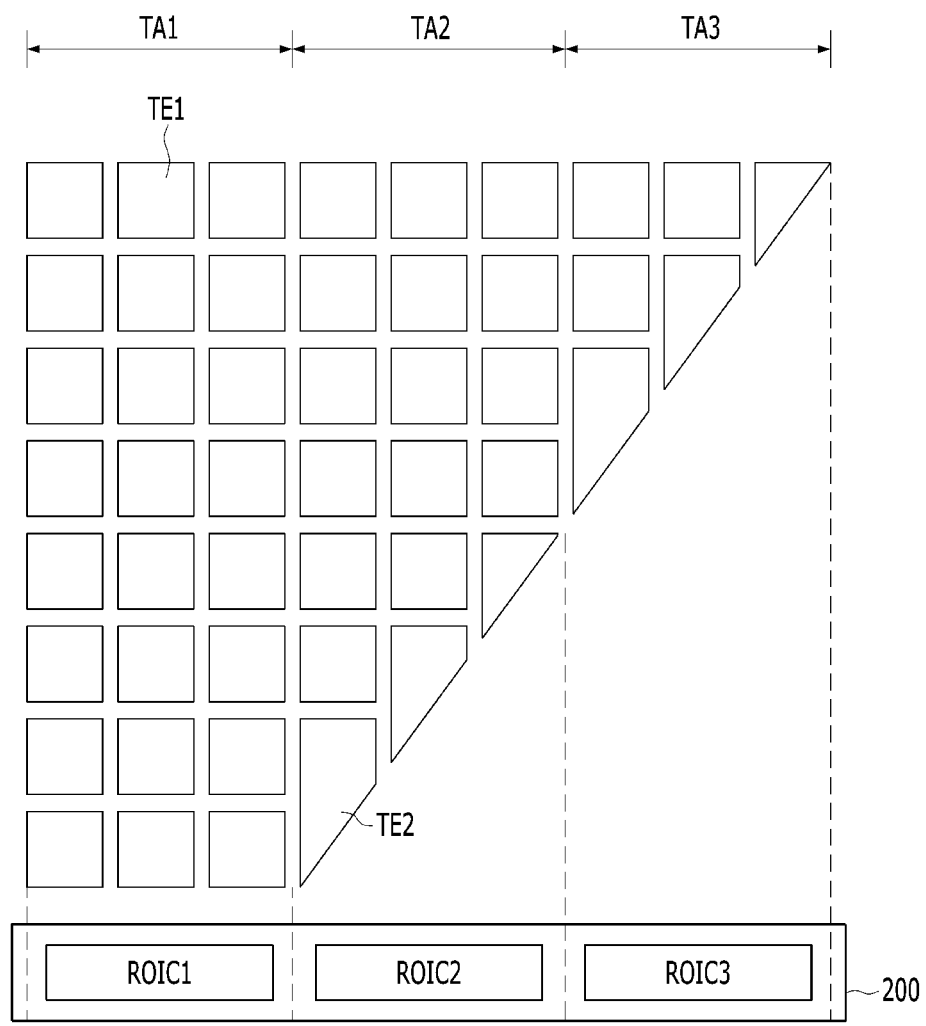
FIG. 5 is a view illustrating a connection relationship between touch electrodes shown in FIG. 1 and a drive circuit unit according to one embodiment of the present disclosure.

FIG. 5 is a view showing a connection relationship between each of the first and second touch electrodes and the drive circuit unit according to the present invention.

As shown in FIG. 5, the drive circuit unit 200 may be realized by a plurality of readout integrated circuits ROIC1-ROIC3 depending on a disposition relationship between the first and second touch electrodes TE1 and TE2. In FIG. 5, a structure in which the drive circuit unit 200 includes three readout integrated circuits ROIC and the first and second touch electrodes TE1 and TE2 are arranged in a matrix form of 8×9 will be described by way of example.

The first readout integrated circuit ROIC1 drives a first touch area TA1 in which first to third touch columns constituted by the first touch electrodes TE1 are disposed, the second readout integrated circuit ROIC2 drives a second touch area TA2 in which fourth to sixth touch columns constituted by the first and second touch electrodes TE1 and TE2 are disposed, and the third readout integrated circuit ROIC3 drives a third touch area TA3 in which seventh to ninth touch columns constituted by the first and second touch electrodes TE1 and TE2 are disposed.

At this time, the number of channels of the second and third readout integrated circuits ROIC2 and ROIC3 is equal to the number of channels of the first readout integrated circuit ROIC1. Since the total number of the touch electrodes TE1 and TE2 in the second and third touch areas TA2 and TA3 is less than the total number of the touch electrodes TE1 in the first touch area TA1, therefore, some of the channels of the second and third readout integrated circuits ROIC2 and ROIC3 are not used. Consequently, data processing speed of the second and third readout integrated circuits ROIC2 and ROIC3 is increased.

Figure 6A:
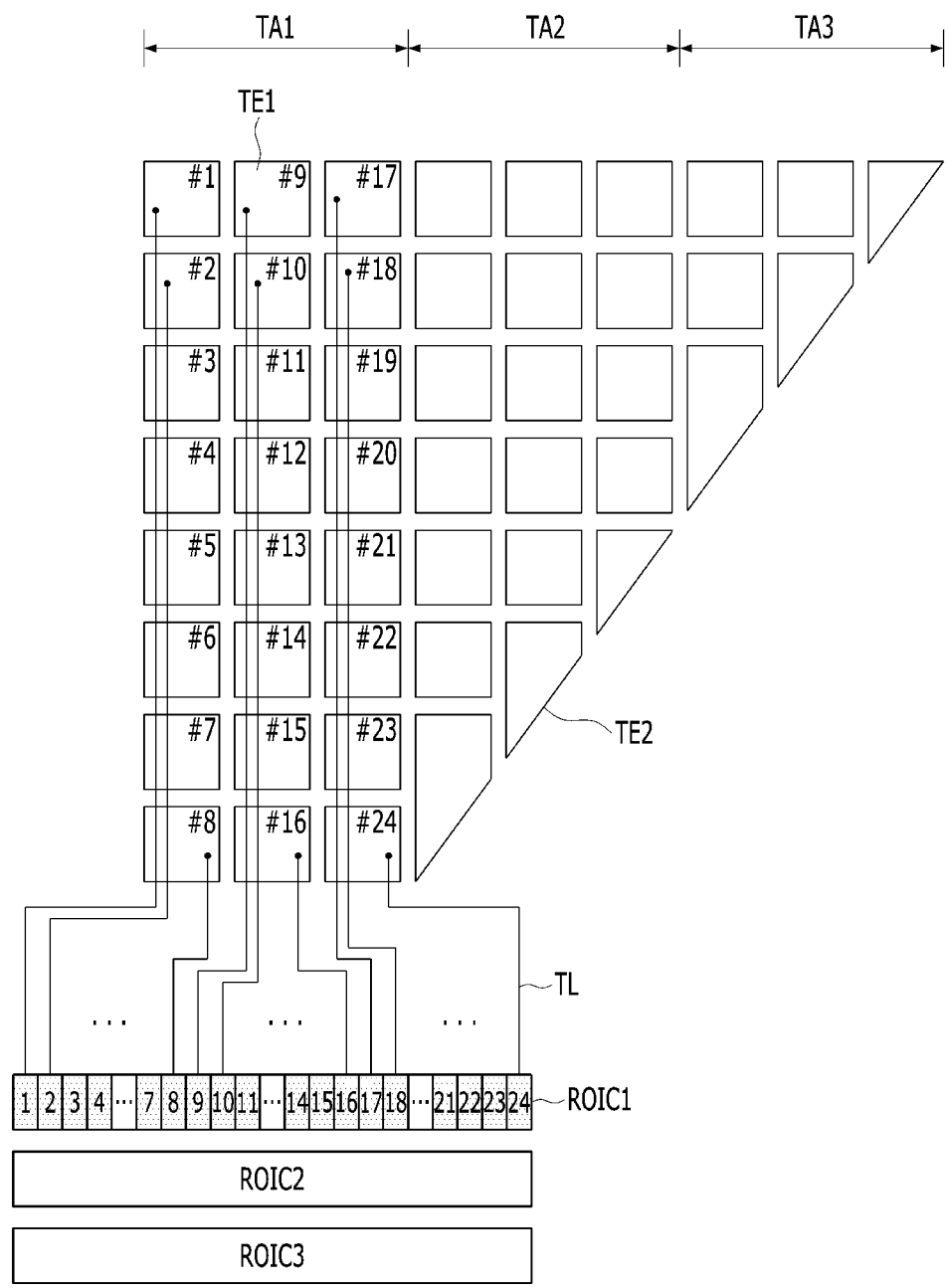
FIGS. 6A to 6C are views illustrating connection relationships between first to third touch areas shown in FIG. 5 and the drive circuit unit according to one embodiment of the present disclosure.

For example, as shown in FIG. 6A, the first readout integrated circuit ROIC1 is electrically connected to a total of 24 touch electrodes TE1 (#1 to #24) disposed in the first touch area TA1 through the touch lines TL. At this time, the 24 channels of the first readout integrated circuit ROIC1 are electrically connected to the touch lines TL.

Figure 6B:
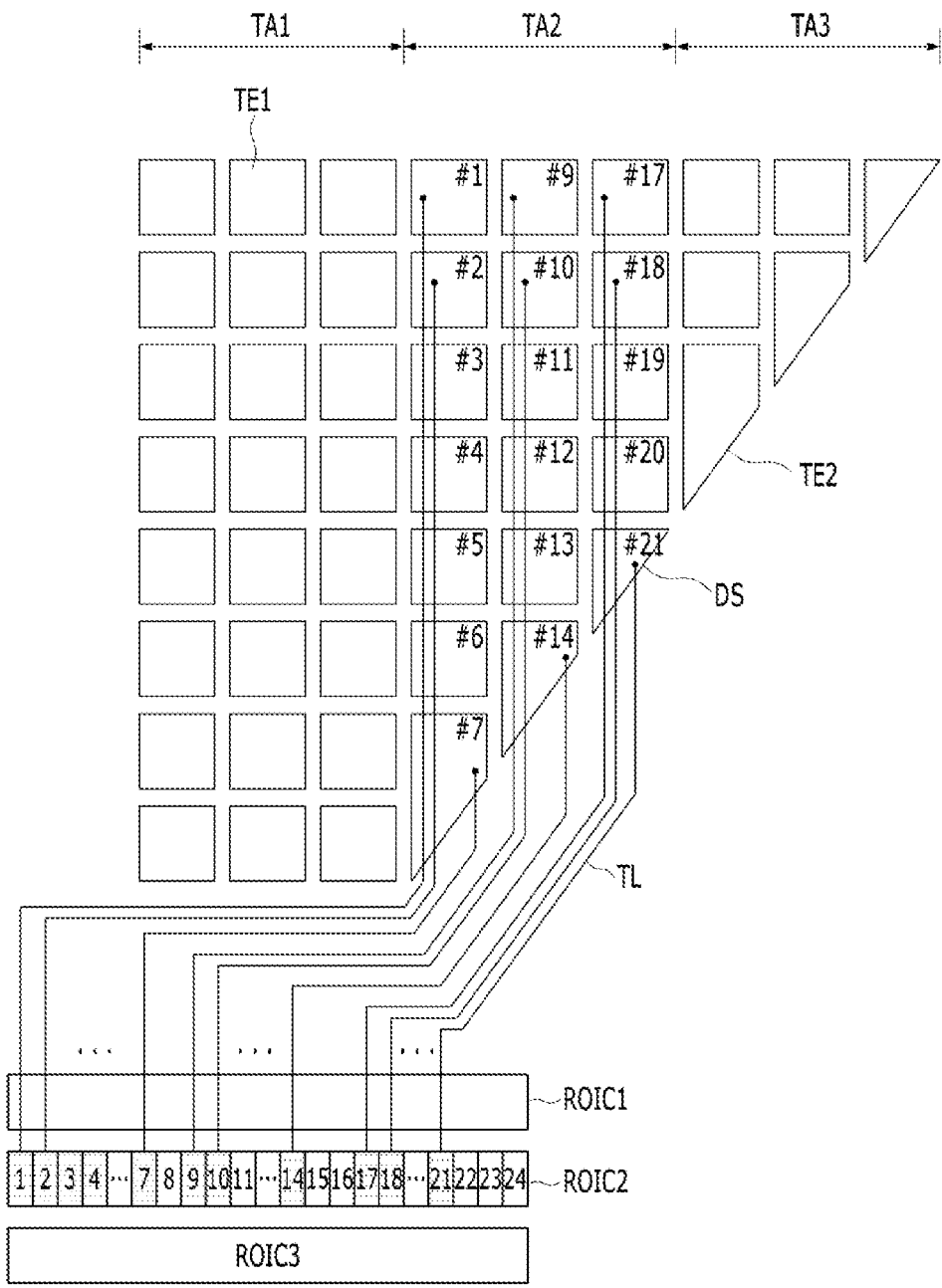

As shown in FIG. 6B, the second readout integrated circuit ROIC2 is electrically connected to a total of 18 touch electrodes TE1 and TE2 (#1 to #7, #9 to #14, and #17 to #21) disposed in the second touch area TA2 through a total of 18 touch lines TL. At this time, a total of 18 channels, among the 24 channels of the second readout integrated circuit ROIC2, is electrically connected to the touch lines TL, and 6 channels are not connected to the touch lines TL. The 6 channels that are not connected to the touch lines TL are uses as dummy channels.

Figure 6C:
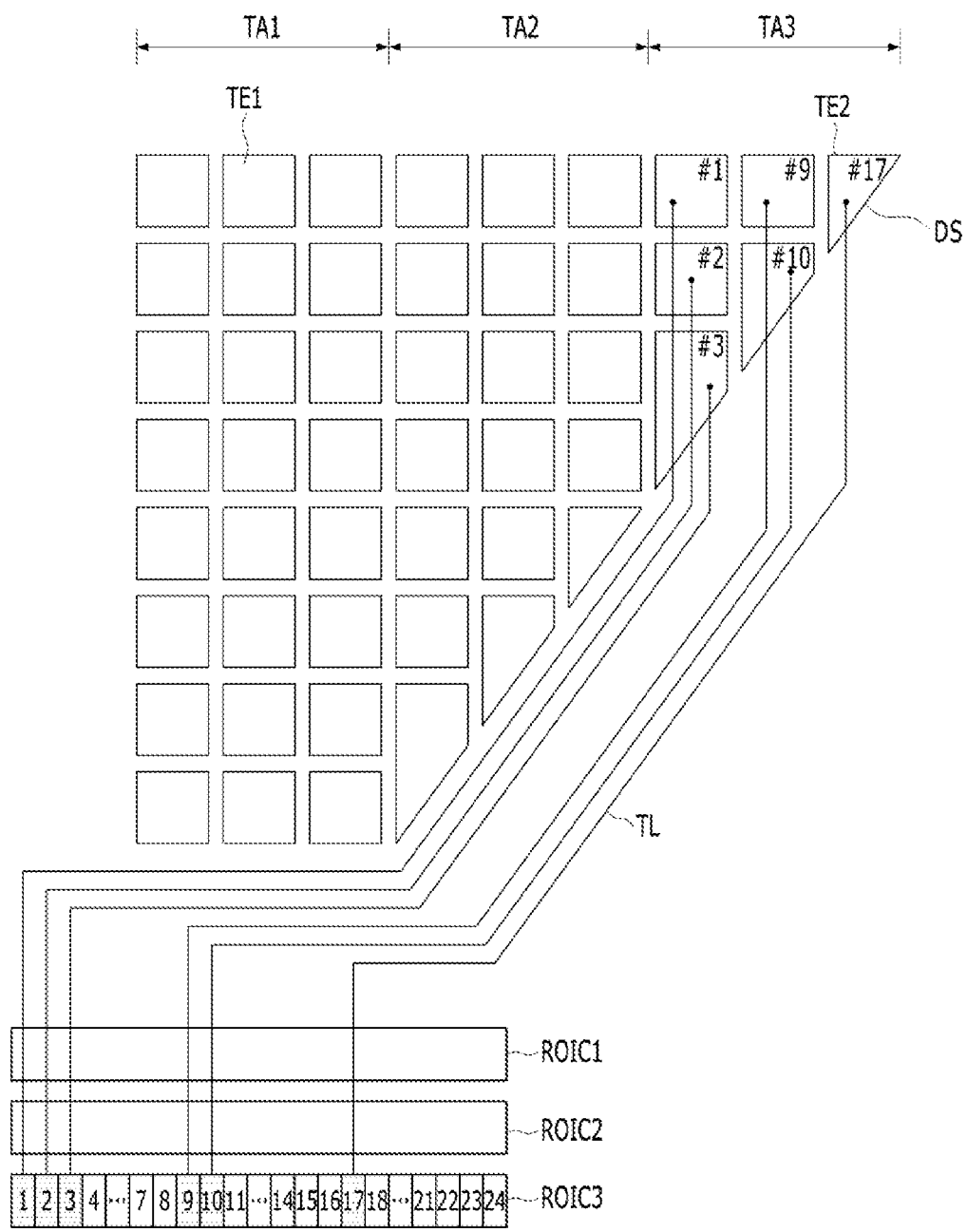

As shown in FIG. 6C, the third readout integrated circuit ROIC3 is electrically connected to a total of 6 touch electrodes TE1 and TE2 (#1 to #3, #9 to #10, and #17) disposed in the third touch area TA3 through a total of 6 touch lines TL. At this time, a total of 6 channels, among the 24 channels of the third readout integrated circuit ROIC3, is electrically connected to the touch lines TL, and 18 channels are not connected to the touch lines TL. The 18 channels that are not connected to the touch lines TL are uses as dummy channels.

Meanwhile, the area of the touch lines TL corresponding to the second and third touch areas TA2 and TA3 in which the second touch electrodes TE2 are disposed that face the different shape side DS of the second touch electrode TE2 are formed along the different shape side. For example, in the case in which the different shape side DS of the second touch electrode TE2 is an oblique line (or a curved line), the area of the touch line TL that faces the different shape side DS of the second touch electrode TE2 is formed so as to have an oblique line (or a curved line).

Figure 7:
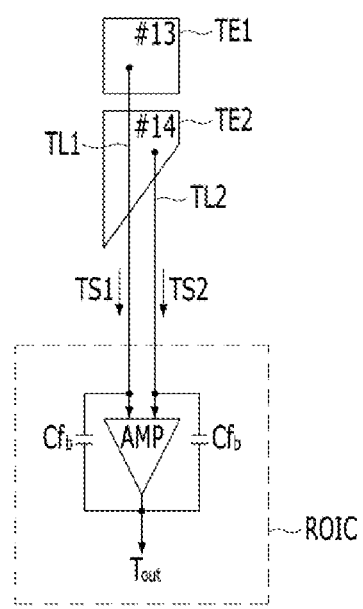
FIG. 7 is a view illustrating a touch sensing method using first and second touch electrodes according to one embodiment of the present disclosure.

FIG. 7 is a view illustrating a sensing method of the touch display device according to the present invention.

As shown in FIG. 7, the readout integrated circuit ROCI constituting the drive circuit unit includes a differential amplifier AMP electrically connected to a plurality of touch lines TL. In FIG. 7, a differential amplifier AMP connected to a first touch line TL1 electrically connected to a 13-th first touch electrode TE1 (#13) disposed in the second touch area TA2 and a second touch line TL2 electrically connected to a 14-th second touch electrode TE2 (#14) disposed in the second touch area TA2 will be described by way of example.

A first reverse input end of the differential amplifier AMP transmits a touch drive signal to the first touch line TL1 and receives a first touch sensing signal TS1 from the first touch line TL1. A second reverse input end of the differential amplifier AMP transmits a touch drive signal to the second touch line TL2 and receives a second touch sensing signal TS2 from the second touch line TL2. Feedback capacitors Cfb are electrically connected between the first reverse input end and an output end and between the second reverse input end and the output end of the differential amplifier AMP.

The differential amplifier AMP performs a differential sensing operation to output a touch output signal Tout proportional to the difference between the first touch sensing signal TS1 received from the first touch electrode TE1 through the first touch line TL1 and the second touch sensing signal TS2 received from the second touch electrode TE2 through the second touch line TL2. It is possible to determine whether there is touch input and to acquire touch coordinates based on a touch output signal Tout. The areas of the first and second touch electrodes TE1 and TE2 are similar to each other. In the case in which there is no touch input, therefore, there is no difference between the first touch sensing signal TS1 received from the first touch electrode TE1 and the second touch sensing signal TS2 received from the second touch electrode TE2, whereby accurate touch sensing is possible.

Figure 8:
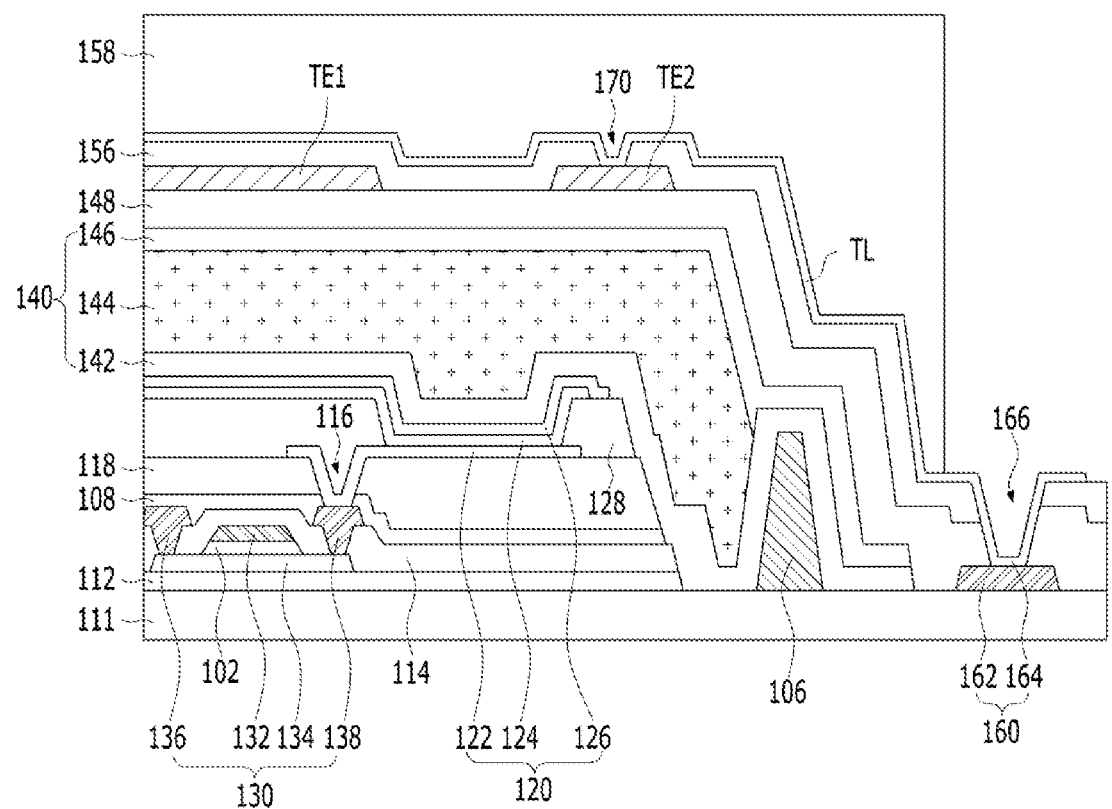
FIG. 8 is a sectional view showing a touch display device including the first and second touch electrodes according to one embodiment of the present disclosure.

The touch sensor having the first and second touch sensors TE1 and TE2 may be directly formed on a light-emitting element 120 without a separate adhesive, as shown in FIG. 8.

As shown in FIG. 8, the touch display device includes light-emitting elements 120 arranged on a substrate 111 in a matrix form, an encapsulation unit 140 disposed on the light-emitting elements 120, and touch electrodes TE1 and TE2 disposed on the encapsulation unit 140.

The substrate 111 is made of a plastic material or a glass material having flexibility so as to be foldable or bendable. For example, the substrate 111 may be made of polyimide (PI), polyethylene terephthalate (PET), polyethylene naphthalate (PEN), polycarbonate (PC), polyethersulfone (PES), polyacrylate (PAR), polysulfone (PSF), or cyclic-olefin copolymer (COC).

A plurality of thin film transistors 130 included in a pixel drive circuit is disposed on the substrate 111. Each of the thin film transistors 130 includes a semiconductor layer 134 disposed on a multi buffer film 112, a gate electrode 132 overlapping the semiconductor layer 134 in the state in which a gate dielectric film 102 is interposed therebetween, and source and drain electrodes 136 and 138 formed on an interlayer dielectric film 114 so as to contact the semiconductor layer 134. Here, the semiconductor layer 134 is made of at least one of an amorphous semiconductor material, a polycrystalline semiconductor material, or an oxide semiconductor material.

The light-emitting element 120 includes an anode 122, at least one light-emitting stack 124 formed on the anode 122, and a cathode 126 formed on the light-emitting stack 124.

The anode 122 is electrically connected to a drain electrode 138 of a thin film transistor 130, which is exposed through a pixel contact hole 116 formed through a passivation film 108 and a pixel planarization layer 118.

The at least one light-emitting stack 124 is formed on the anode 122 in a light-emitting area defined by a bank 128. The at least one light-emitting stack 124 is formed by stacking a hole-related layer, an organic light-emitting layer, and an electron-related layer on the anode 122 in that order or in reverse order. In addition, the light-emitting stack 124 may include first and second light-emitting stacks that are opposite each other in the state in which a charge generation layer is disposed therebetween. In this case, the organic light-emitting layer of one of the first and second light-emitting stacks generates blue light, and the organic light-emitting layer of the other of the first and second light-emitting stacks generates yellowish-green light. Consequently, white light is generated by the first and second light-emitting stacks. The white light generated by the light-emitting stack 124 is incident on a color filter, which is located above or under the light-emitting stack 124, to realize a color image. Alternatively, each light-emitting stack 124 may generate colored light corresponding to each subpixel without a separate color filter in order to realize a color image. That is, the light-emitting stack 124 of the red subpixel may generate red light, the light-emitting stack 124 of the green subpixel may generate green light, and the light-emitting stack 124 of the blue subpixel may generate blue light.

The cathode 126 is formed so as to be opposite the anode 122 in the state in which the light-emitting stack 124 is disposed therebetween, and is connected to a low-voltage supply line.

The encapsulation unit 140 reduces external moisture or oxygen from permeating into the light-emitting element 120, which has low resistance to external moisture or oxygen. To this end, the encapsulation unit 140 includes at least one inorganic encapsulation layer 142 and at least one organic encapsulation layer 144. In the present disclosure, an encapsulation unit 140 having a structure in which a first inorganic encapsulation layer 142, an organic encapsulation layer 144, and a second inorganic encapsulation layer 146 are sequentially stacked will be described by way of example.

The first inorganic encapsulation layer 142 is formed on the substrate 111 on which the cathode 126 is formed. The second inorganic encapsulation layer 146 is formed on the substrate 111 on which the organic encapsulation layer 144 is formed, and is formed so as to surround the upper surface, the lower surface, and the lateral surface of the organic encapsulation layer 144 together with the first inorganic encapsulation layer 142.

The first and second inorganic encapsulation layers 142 and 146 reduce external moisture or oxygen from permeating into the light-emitting stack 124. Each of the first and second inorganic encapsulation layers 142 and 146 is made of an inorganic dielectric material that can be deposited at a low temperature, such as silicon nitride ($SiN_x$), silicon oxide ($SiO_x$), silicon oxynitride (SiON), or aluminum oxide ($Al_2O_3$). Consequently, each of the first and second inorganic encapsulation layers 142 and 146 is deposited in a low-temperature atmosphere, whereby it is possible to reduce damage to the light-emitting stack 124, which has low resistance to a high-temperature atmosphere, when each of the first and second inorganic encapsulation layers 142 and 146 is deposited.

The organic encapsulation layer 144 reduces stress between the layers due to bending of the organic light-emitting display device and improves planarization. The organic encapsulation layer 144 is formed on the substrate 111 on which the first inorganic encapsulation layer 142 is formed, and is made of a non-photosensitive organic dielectric material, such as a particle cover layer (PCL), an acrylic resin, an epoxy resin, polyimide, polyethylene, or silicon oxycarbide (SiOC), or a photosensitive organic dielectric material, such as photo acrylic. The organic encapsulation layer 144 is disposed in the active area AA, excluding the non-active area NA. To this end, at least one dam 106 is disposed to reduce the organic encapsulation layer 144 from spreading to the non-active area NA. The at least one dam 106 is made of the same material as at least one of the pixel planarization layer 118, the bank 128, or a spacer (not shown). The plurality of touch electrodes TE1 and TE2 and the touch lines TL are disposed on the encapsulation unit 140.

The plurality of touch electrodes TE1 and TE2 is independently formed on the encapsulation unit 140 in the state of being split in first and second directions that intersect each other. The plurality of touch electrodes TE1 and TE2 is formed in an area corresponding to the plurality of subpixels in consideration of user touch area. For example, one of the touch electrodes TE1 and TE2 is formed so as to correspond to an area several times to several hundred times larger than one subpixel.

Each of the touch electrodes TE1 and TE2 is formed so as to have a single-layered structure or a multi-layered structure using an opaque metal that exhibits high corrosion resistance, acid resistance, and conductivity, such as Ta, Ti, Cu, or Mo, or is formed so as to have a multi-layered structure using an ITO-, IZO-, IZGO-, or ZnO-based transparent conductive film and an opaque metal.

As shown in FIGS. 3A to 3D, each of the touch electrodes TE1 and TE2 including the opaque metal is formed in a plate shape using a transparent conductive film, or is formed in a mesh shape in which the touch electrode does not overlap the light-emitting area of each subpixel and overlaps the bank 128 disposed between the light-emitting areas. The mesh-shaped touch electrodes TE1 and TE2 exhibit higher conductivity than a transparent conductive film, whereby the touch electrodes TE1 and TE2 may be formed as low-resistance electrodes. Consequently, the resistance and capacitance of each of the touch electrodes TE1 and TE2 are reduced, whereby an RC time constant is reduced and thus touch sensitivity is improved. In addition, each of the mesh-shaped touch electrodes TE1 and TE2 overlaps the bank 128 while having a line width equal to or less than the line width of the bank 128, whereby it is possible to prevent reduction in an aperture ratio and transmittance due to the touch electrodes TE1 and TE2.

Each of the plurality of touch lines TL is disposed between a corresponding one of the touch electrodes TE1 and TE2 and the drive circuit unit 200 in the active area AA, and performs electrical connection therebetween. Each of the plurality of touch lines TL is electrically connected to a corresponding one of the touch electrodes TE1 and TE2 exposed through a touch contact hole 170 formed through a touch dielectric film 156. Each of the touch lines TL is disposed so as to extend from the active area to the non-active area along the lateral surface of the encapsulation unit 140, and is electrically connected to a touch pad 160.

The touch pad 160 includes first and second pad electrodes 162 and 164 electrically connected to each other through a pad contact hole 166. The first pad electrode 162 is made of the same material and is disposed in the same plane as the source and drain electrodes 136 and 138. The second pad electrode 164 is made of the same material and is disposed in the same plane as the touch lines TL. The second pad electrode 164 is electrically connected to the first pad electrode 162 exposed through the pad contact hole 166 formed through a touch buffer film 148 and the touch dielectric film 156. The touch pad 160 including the first and second pad electrodes 162 and 164 is electrically connected to the drive circuit unit 200 including the readout integrated circuit ROIC.

A touch passivation film 158 is disposed on the electrodes TE1 and TE2 and the touch lines TL so as to expose the touch pad 160. The touch passivation film 158 is formed so as to cover the touch electrodes TE1 and TE2, whereby it is possible to reduce damage to the touch electrodes TE1 and TE2. The touch passivation film 158 is made of an organic insulative material, such as epoxy or acrylic, and is formed in the shape of a thin film or a film, is made of an inorganic insulative material, such as SiNx or SiOx, or is formed of a polarizing film.

Meanwhile, in the present disclosure, the structure in which the second touch electrodes TE2 are disposed at the edge of the active area AA has been described by way of example. Alternatively, as shown in FIGS. 9A and 9B, the second touch electrodes TE2 may be disposed in the active area AA.

Figure 9A:
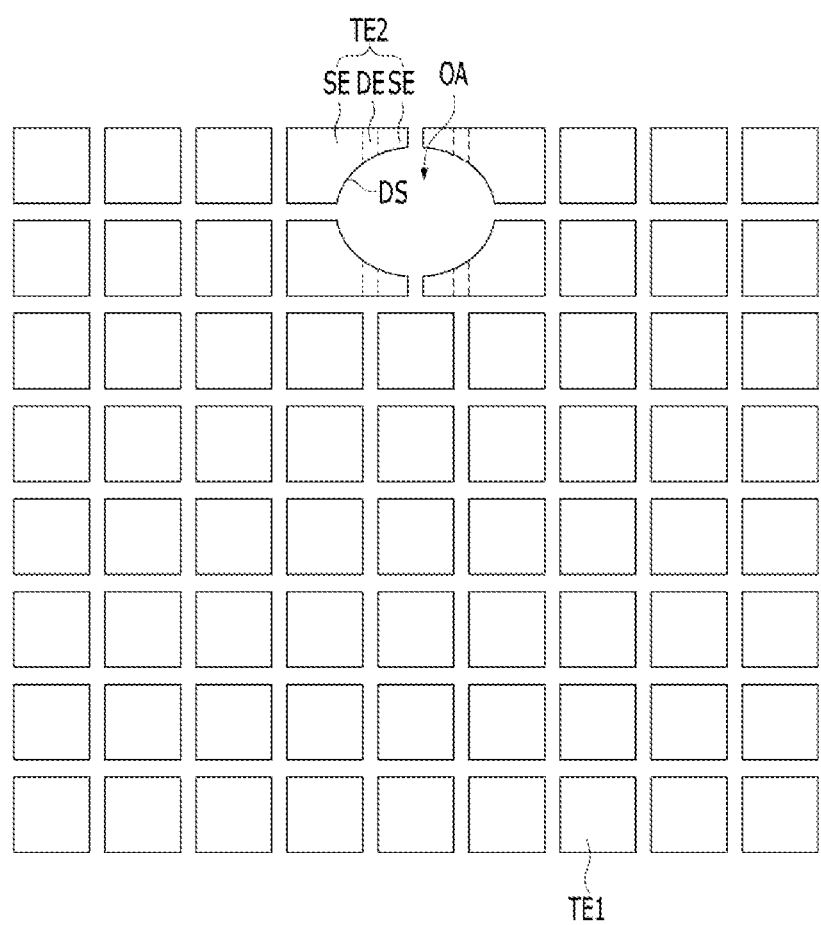
FIGS. 9A and 9B are views showing second touch electrodes configured to provide an opening area in the touch display device according to one embodiment of the present disclosure.
Figure 9B:
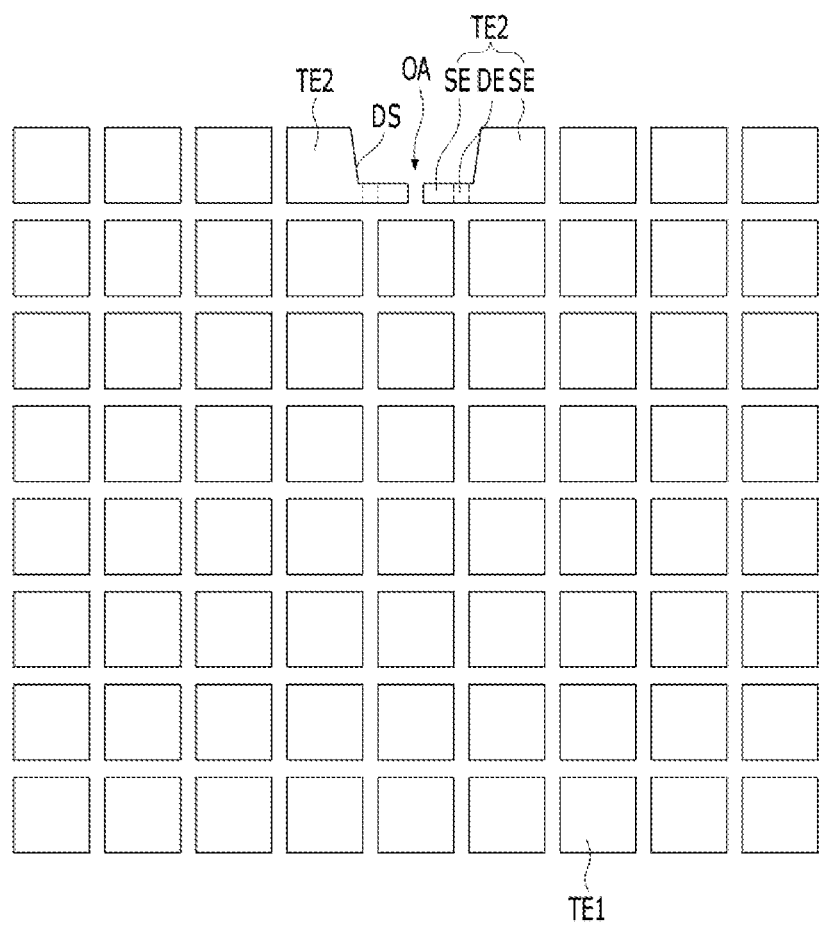

Different shape sides DS of the second touch electrodes TE2 shown in FIGS. 9A and 9B are disposed so as to provide an opening area OA in the active area. The opening area OA may be formed in a hole shape (e.g., an oval shape), as shown in FIG. 9A, or may be formed in a notch shape (e.g., shape with corners), as shown in FIG. 9B. Each of the second touch electrodes TE2 configured to provide an opening area OA is formed by coupling sub-electrodes SE adjacent to each other in at least one of the upward-downward direction or the leftward-rightward direction and a dummy electrode DE disposed between the sub-electrodes SE to each other.

Figure 2A:
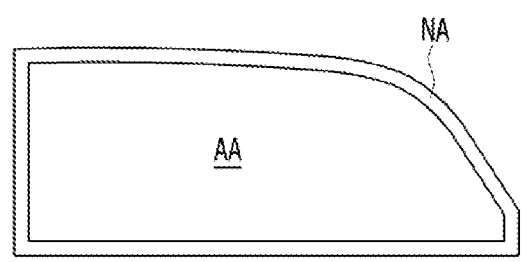
FIGS. 2A to 2D are plan views showing other shapes of a display panel shown in FIG. 1 according to one embodiment of the present disclosure.
Figure 2B:
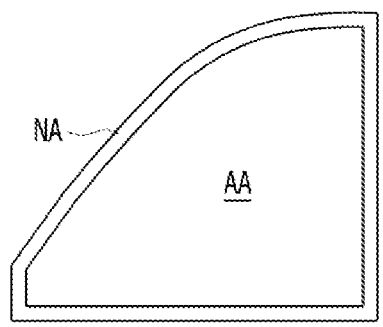
Figure 2C:
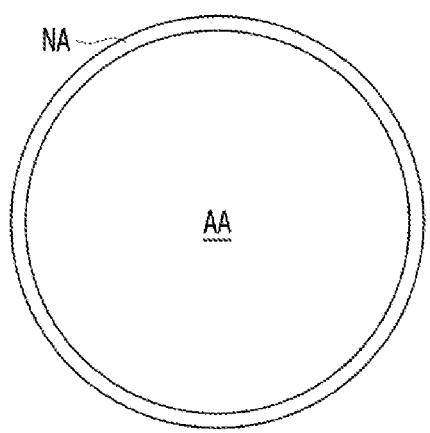
Figure 2D:
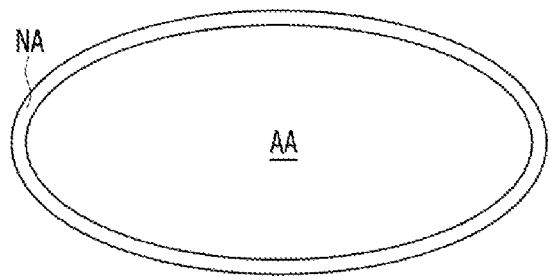

Also, in the present disclosure, the structure in which the drive circuit unit 200 in which the touch drive circuit and the display drive circuit are integrated and the different shape surface of the active area AA are disposed so as to face each other has been described by way of example. That is, not only the display panel constituted by only the different shape surface, as shown in FIGS. 2C and 2D, but also the display panel having the different shape surface and the straight surface, as shown in FIGS. 1, 2A, and 2B, is disposed such that the different shape surface of the active area AA of the display panel faces the drive circuit unit 200.

Figure 10A:
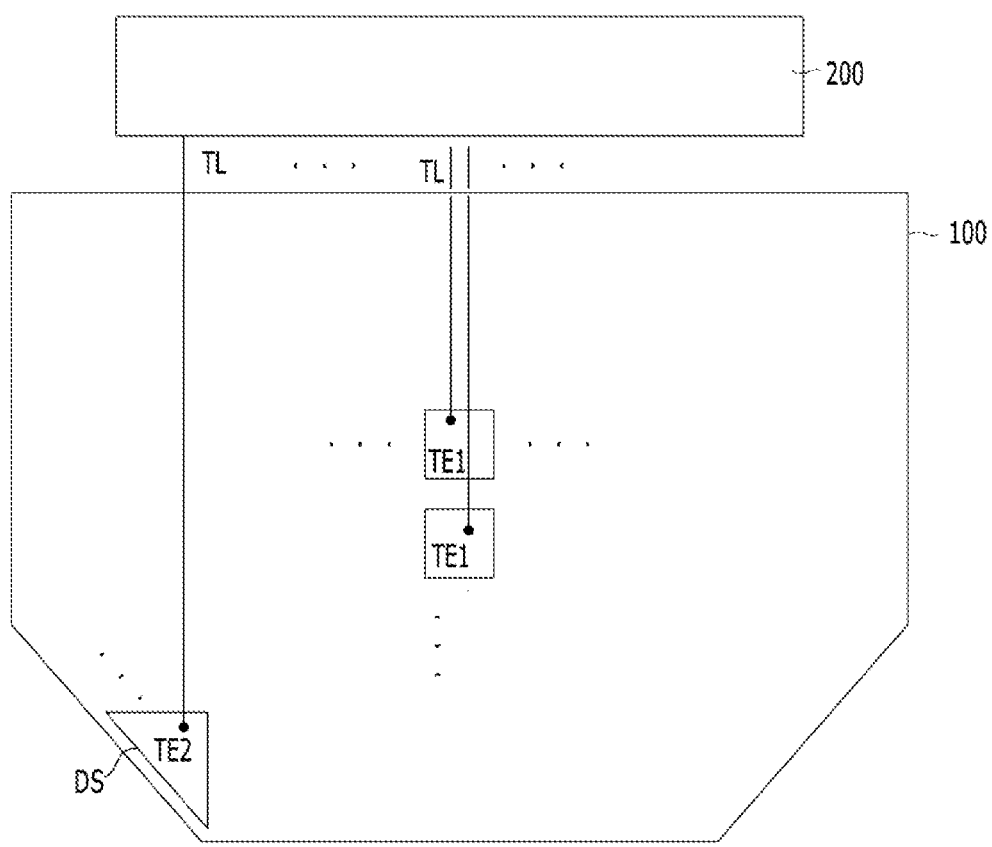
FIGS. 10A and 10B are views illustrating a disposition relationship between the drive circuit unit and different shape surfaces of a display panel according to one embodiment of the present disclosure.

In addition, as shown in FIG. 10A, the display panel 100 having the different shape surface and the straight surface may be disposed such that the straight surface of the display panel 100 faces the drive circuit unit 200, or may be disposed such that at least two of the different shape surface or the straight surface face the drive circuit unit 200.

Figure 10B:
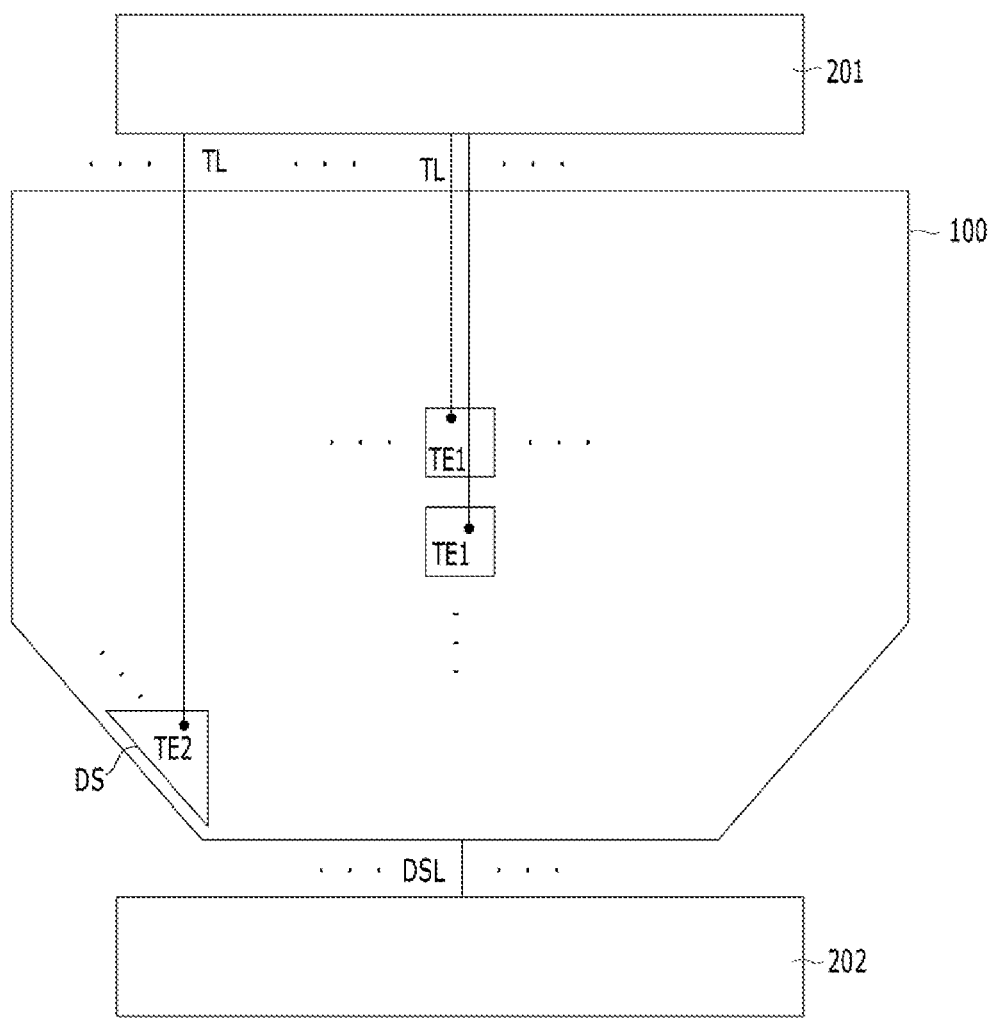

Furthermore, as shown in FIG. 10B, a touch drive circuit 201 and a display drive circuit 202 constructed separately from the touch drive circuit 201 may be disposed at different surfaces of the active area AA. At this time, the touch drive circuit 201 is disposed so as to face at least one of the different shape surface or the straight surface of the active area AA. In addition, the display drive circuit 202, which is electrically connected to display signal lines DSL configured to supply drive signals to subpixels, is disposed so as to face at least one of the different shape surface or the straight surface of the active area AA.

As is apparent from the above description, in the present disclosure, at least one of the plurality of second touch electrodes each having at least one different shape side is formed by connecting at least two sub-electrodes having smaller areas than each of the first touch electrodes to each other. In the present disclosure, therefore, the areas of the first and second touch electrodes are similar to each other, whereby it is possible to reduce touch performance deterioration, such as touch sensitivity and touch accuracy, due to deviation in area between the touch electrodes.

Also, in the present disclosure, the areas of the first and second touch electrodes disposed in the active area are similar to each other, and therefore no touch electrode having a small area is provided, whereby it is possible to reduce deterioration in touch sensitivity.

Furthermore, in the present disclosure, the different shape sides of the second touch electrodes having similar areas to the first touch electrodes are disposed along the edge of the active area having the oblique line and the curved line. Consequently, it is not necessary to extend the second touch electrodes to the bezel area, compared to a conventional structure in which the second touch electrodes extend to the bezel area so as to have similar areas to the first touch electrodes, whereby it is possible to realize a narrow bezel.

The above description merely illustrates the present invention, and it will be apparent to those skilled in the art that various modifications and variations can be made in the present disclosure without departing from the technical idea of the present invention. Therefore, the embodiments disclosed in the specification of the present disclosure do not limit the present disclosure. The scope of the present inven-

What is claimed is:

1. A touch display device comprising:
a substrate;
a plurality of first touch electrodes disposed in an active area of the substrate;
a plurality of second touch electrodes disposed in the active area of the substrate, the plurality of second touch electrodes having different shapes from the plurality of first touch electrodes;
a plurality of touch lines electrically connected to the plurality of first touch electrodes and the plurality of second touch electrodes,
a first readout integrated circuit driving the plurality of first touch electrodes in a first touch area; and
a second readout integrated circuit driving the plurality of first touch electrodes and the plurality of second touch electrodes in a second touch area,
wherein at least one of the plurality of second touch electrodes comprises at least two sub-electrodes having smaller areas than each of the plurality of first touch electrodes to each other,
wherein the first readout integrated circuit and the second readout integrated circuit includes a plurality of channels respectively,
wherein the plurality of channels of the first readout integrated circuit are electrically connected to the plurality of touch lines connected to the plurality of first electrodes in the first touch area, and
wherein at least one of channels of the second readout integrated circuit is a dummy channel without connecting the plurality of touch lines.

2. The touch display device according to claim 1, wherein each of the plurality of second touch electrodes has at least one different shape side, which is at least one of a curved line or an oblique line, different from the plurality of first touch electrodes.

3. The touch display device according to claim 2, wherein each of the plurality of second touch electrodes further comprises at least one dummy electrode disposed between the at least two sub-electrodes so as to interconnect the at least two sub-electrodes,
each of the at least two sub-electrodes and the at least one dummy electrode has the different shape side, and
each of the at least two sub-electrodes and the at least one dummy electrode has a smaller area than each of the plurality of first touch electrodes.

4. The touch display device according to claim 3, wherein the at least one dummy electrode is disposed parallel to an area between the plurality of first touch electrodes.

5. The touch display device according to claim 2, wherein the different shape sides of the plurality of second touch electrodes are disposed along an edge of the active area.

6. The touch display device according to claim 2, wherein the different shape sides of the plurality of second touch electrodes are disposed in the active area so as to provide an opening area in the active area.

7. The touch display device according to claim 2, wherein areas of the plurality of touch lines that face the different shape sides of the plurality of second touch electrodes are formed along the different shape sides.

8. The touch display device according to claim 1, wherein
at least one of the plurality of second touch electrodes has an area greater than 100% and less than 120% of an area of each of the plurality of first touch electrodes, and
other ones of the plurality of second touch electrodes have areas equivalent to 80 to 100% of the area of each of the plurality of first touch electrodes.

9. The touch display device according to claim 1, further comprising:
a light-emitting element disposed in the active area; and
an encapsulation unit disposed on the light-emitting element, wherein
the plurality of first touch electrodes and the plurality of second touch electrodes are disposed on the encapsulation unit, and
the plurality of touch lines are disposed along a lateral surface of the encapsulation unit.

10. The touch display device according to claim 1, further comprising:
a drive circuit unit connected to the plurality of touch lines, wherein
the drive circuit unit is disposed so as to face a different shape surface of the active area.

11. The touch display device according to claim 1, further comprising:
a drive circuit unit connected to the plurality of touch lines, wherein
the drive circuit unit is disposed so as to face at least one of a different shape surface and a straight surface of the active area.

12. The touch display device according to claim 1, wherein a number of the plurality of channels of the second readout integrated circuit is equal to a number of the plurality of channels of the first readout integrated circuit.

* * * * *